United States Patent Office 3,057,656
Patented Oct. 9, 1962

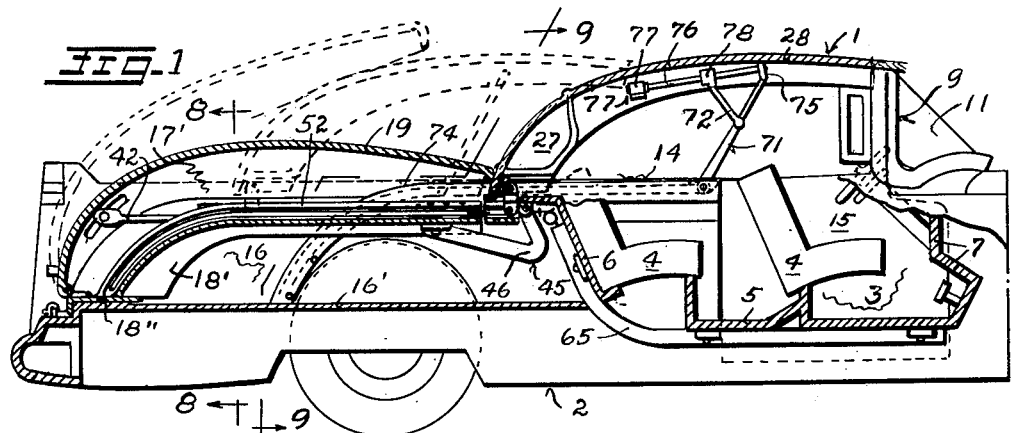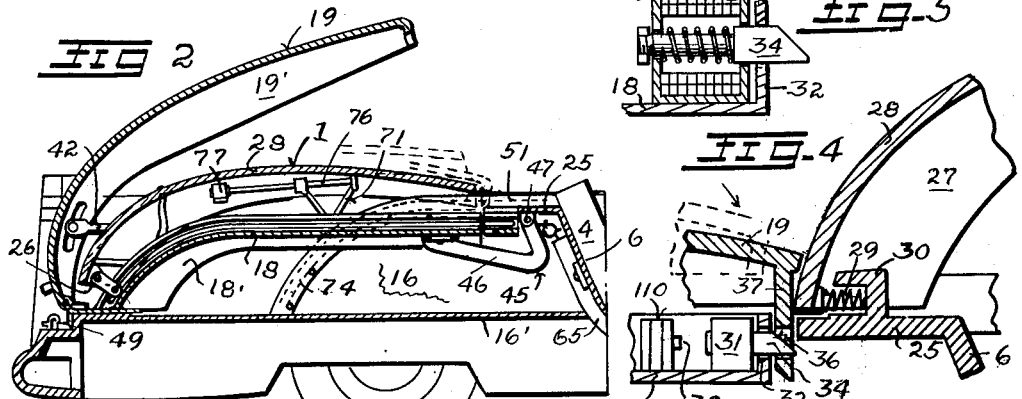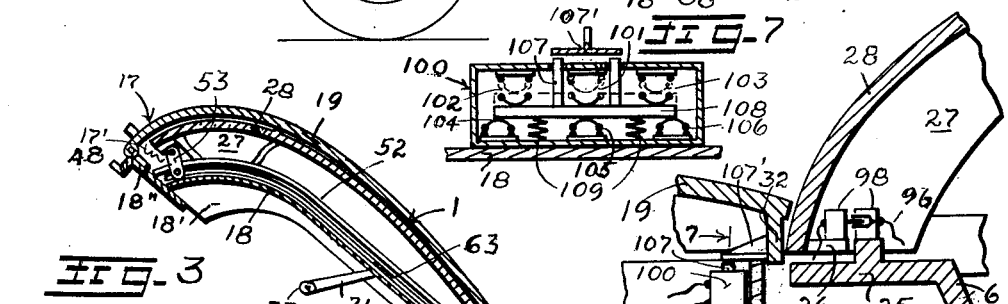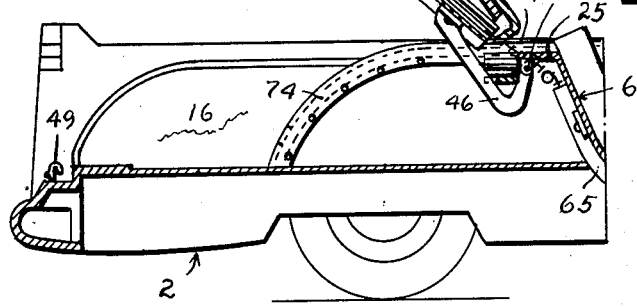

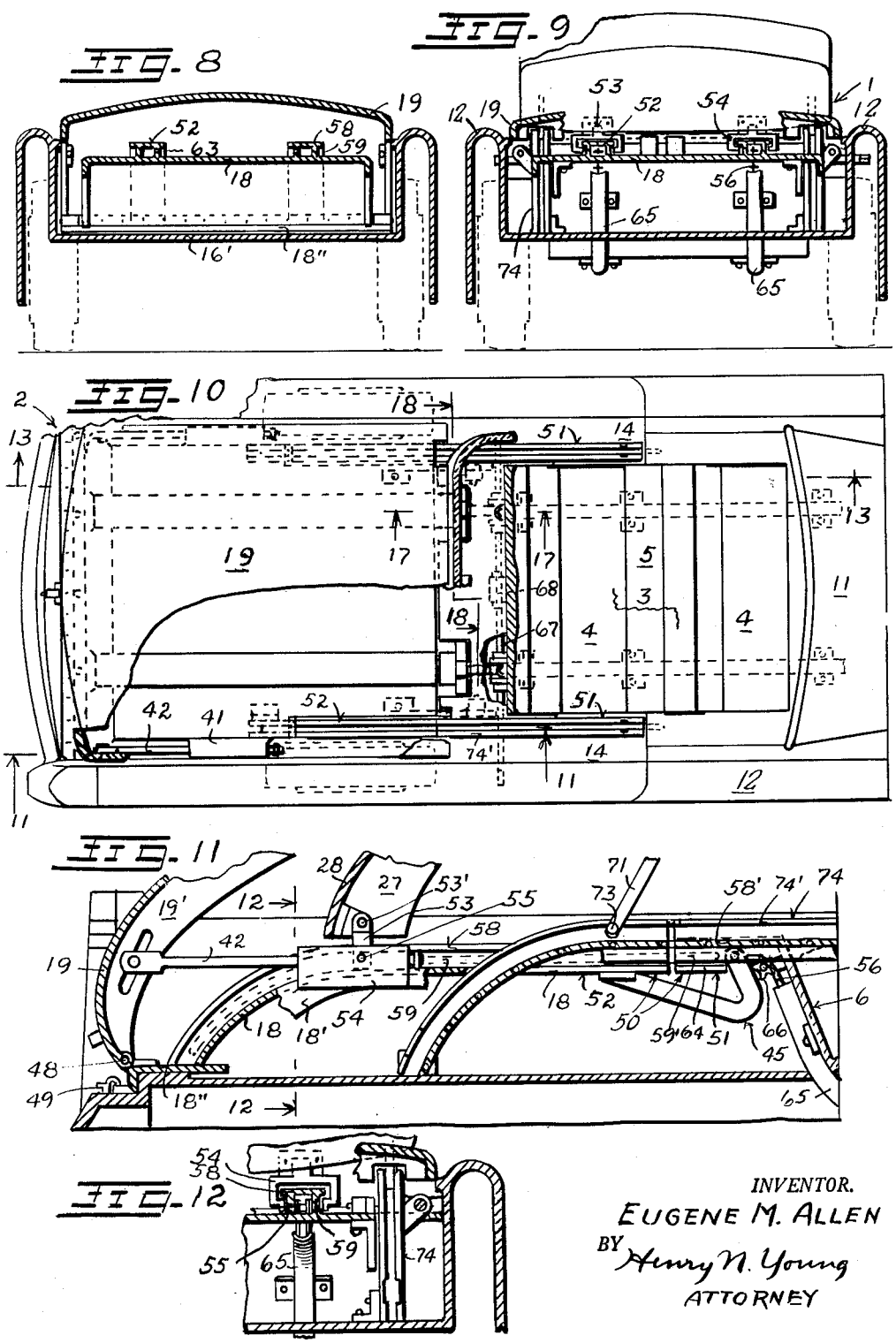

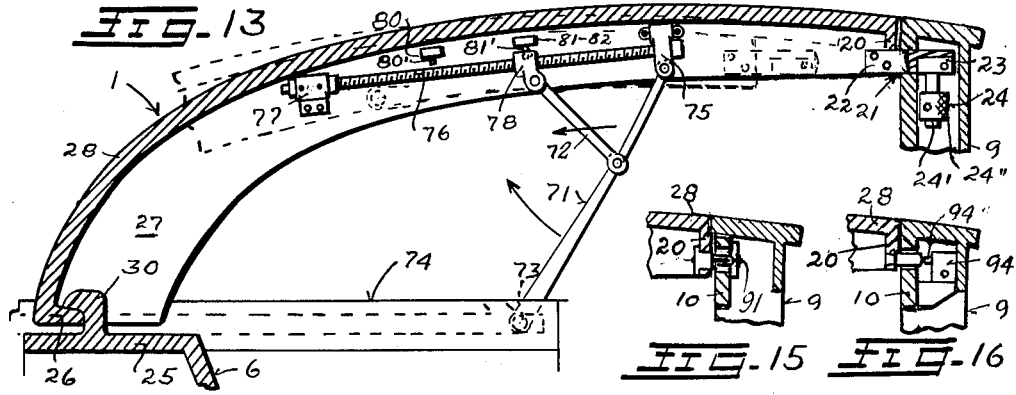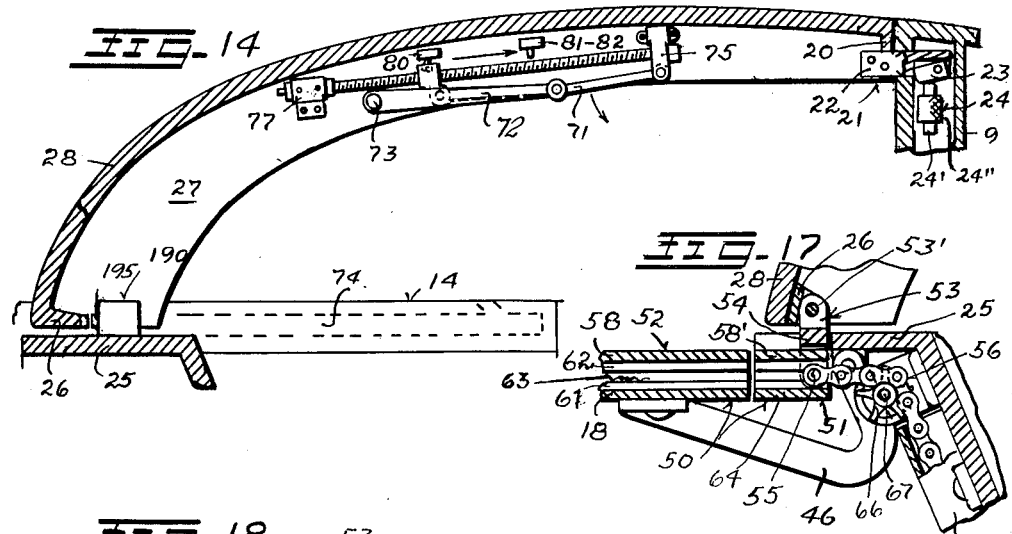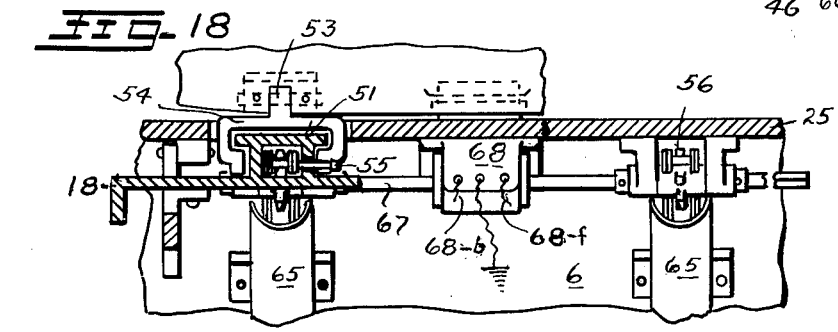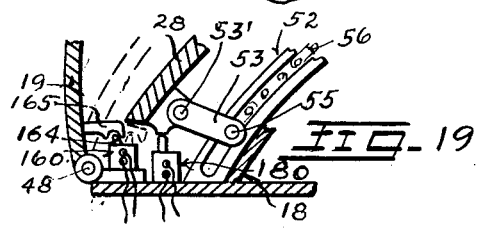

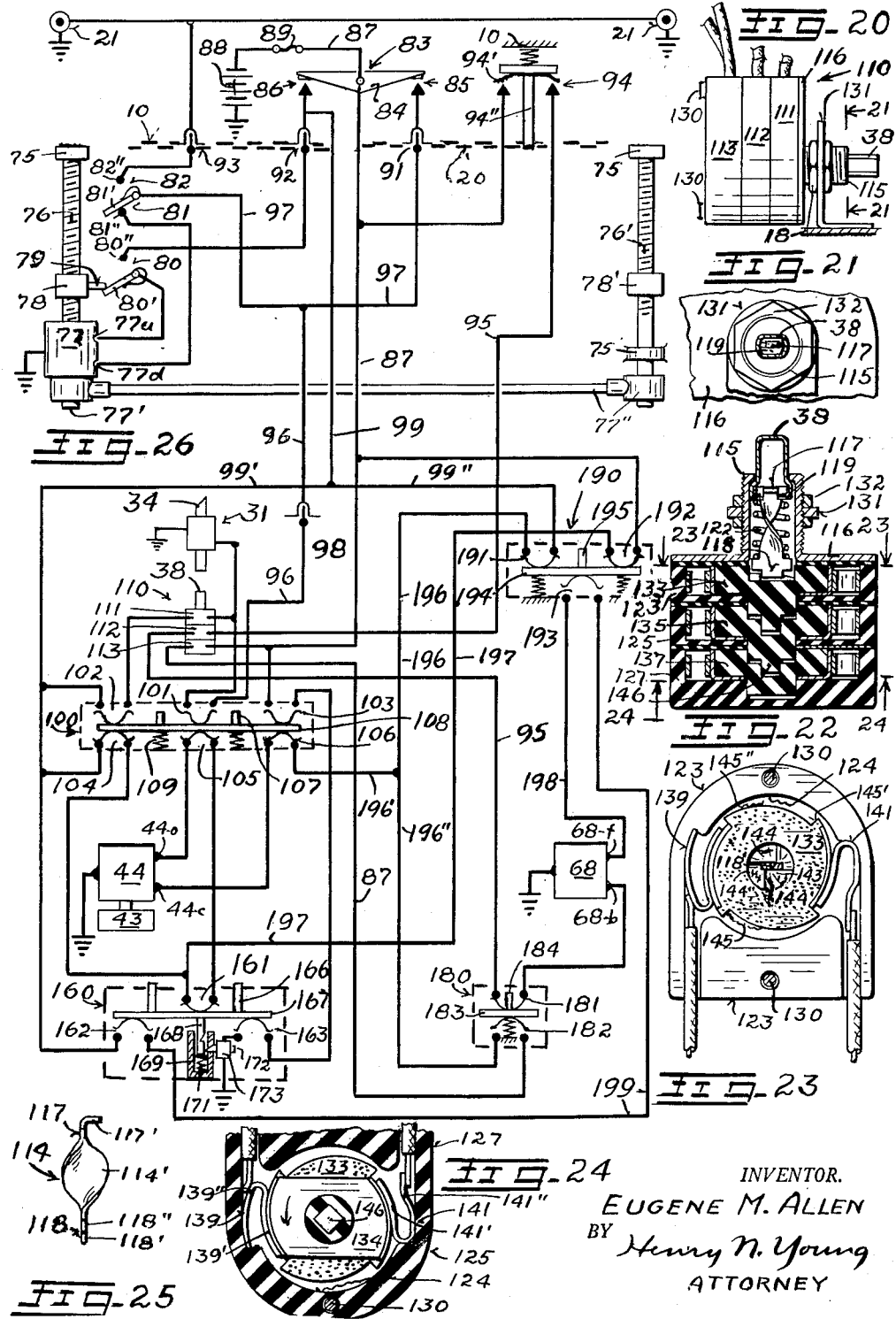

3,057,656
AUTOMOBILE TOP MOUNTING AND ACTUATING MEANS
Eugene M. Allen, 503 Superior Ave., San Leandro, Calif.
Filed May 26, 1960, Ser. No. 31,876
9 Claims. (Cl. 296—117)

The invention relates to a mounting of a rigid top for the body of an automobile of the convertible type in which the top is adjustable between limiting positions in which it overlies the seating compartment of the vehicle or is fully displaced from over said compartment.

In automobiles of the identified type, various manual and/or power-actuated devices have heretofore been provided for shifting a retainedly-carried top between limiting positions in which it is in operative covering relation to the seating compartment of the automobile or is inoperatively disposed, and the devices of the present invention have been designed to avoid certain disadvantages found in previously known-top-mounting and shifting arrangements of the tops of convertible automobiles.

It is, accordingly, a general object of the present invention to provide a top-shifting means of the character described which is particularly simple and dependable for effecting the fore-and-aft shifting of an attached rigid automobile top entirely by electrically actuated devices.

Another object is to provide a particularly dependable automatic auto top control system for progressively carrying forward and automatically terminating complete cycles of top-lowering or top-raising operations following appropriate initial manual settings of solely a two-way cycle-starting switch of the system by an occupant of the vehicle.

A more specific object is to utilize an electrical top-positioning control of the character described in which all controlling switches except the two-way manually settable cycle-starting switch are mechanically controlled in automatic sequence during the top-positioning cycles, all without the use of any electrically-actuated switches.

A further object is to provide an electrical control circuit utilizing multi-switch units in a manner which minimize the required number of mechanical switch-setting operations.

An added object is to provide a device of the character described wherein the lowered top is fully concealed within a deck-lid assembly for the luggage compartment of the auto, with said assembly raiseable from the rear to provide for full access to said compartment, whether containing the auto top or not.

Another object is to provide a top-positioning control of the character described in which all switches except the set cycle-initiating master switch are mechanically opened or closed in automatic sequence during a cycle of operations, with the set master switch in the operator's compartment remaining in its set position after the cycle is completed.

A more specific object is to provide a top-positioning control in which a rigid top is held in fixed angular relation to a supporting body which extends no higher from the vehicle wheelbase than the rear end of the raised top.

The invention possesses other objects and features of advantage, some of which, with the foregoing, will be set forth or be apparent in the following description of a typical embodiment thereof, and in the accompanying drawings, in which, FIGURE 1 is a partly sectional side view of a portion of a vehicle comprising a convertible auto at and rearwardly of the body windshield with the auto top shown in its fully raised position.

FIGURE 2 is a side sectional view showing a rearward portion of the structure of FIGURE 1 having the top fully lowered into a deck-lid assembly having a lid element thereof in open position.

FIGURE 3 is a view showing the deck-lid carrying the top raised at its rear end to provide access to the luggage compartment beneath it.

FIGURE 4 is an enlarged fragmentary sectional view taken longitudinally of the auto body at the mutually opposed rear and forward ends of the raised top and closed deck-lid respectively.

FIGURE 5 is an enlarged axial section of an electromagnetic latch of FIGURE 4.

FIGURE 6 is a fragmentary sectional view taken from a plane parallel to that of FIGURE 4 and shows the locations of certain control switches.

FIGURE 7 is an enlarged fragmentary section of a unitary switch assembly taken at the line 7—7 in FIGURE 6.

FIGURE 8 is a section taken at the plane of the line 8—8 in FIGURE 1.

FIGURE 9 is a section taken at the broken line 9—9 in FIGURE 1.

FIGURE 10 is a broken-away plan view of the vehicle of FIGURE 1.

FIGURE 11 is an enlarged sectional view at the line 11—11 in FIGURE 10.

FIGURE 12 is an enlarged sectional view at the line 12—12 in FIGURE 11.

FIGURE 13 is an enlarged sectional view taken from the line 13—13 in FIGURE 10, with a support strut for the forward top end operatively disposed.

FIGURE 14 is a view corresponding to FIGURE 13, but showing the strut withdrawn to an inoperative position within the top space.

FIGURE 15 is a partly diagrammatic fragmentary sectional view of an electrical connection at the windshield frame of the vehicle.

FIGURE 16 is a partly diagrammatic fragmentary sectional view of an on-and-off switch arrangement provided on the windshield frame.

FIGURE 17 is an enlarged fragmentary view taken from the line 17—17 in FIGURE 10.

FIGURE 18 is a view taken from the broken line 18—18 in FIGURE 10.

FIGURE 19 is a partly sectional elevation showing installations of certain control switches provided at the rear end of the deck-lid.

FIGURE 20 is an enlarged elevation of a switch assembly of FIGURE 4.

FIGURE 21 is a fragmentary elevation taken at the line 21—21 in FIGURE 20.

FIGURE 22 is an enlarged axial section of the multiple switch of FIGURES 20 and 21.

FIGURE 23 is a view taken from the line 23—23 in FIGURE 22.

FIGURE 24 is a view taken from the line 24—24 in FIGURE 22.

FIGURE 25 is an enlarged elevation of a switch-actuating element and engaged members shown in FIGURE 22.

FIGURE 26 is a schematic wiring diagram of the positioning controls for the top and the deck-lid, with the various switches and other operative elements shown as conditioned while the top is held in its raised position.

For illustrating the features thereof, the present mounting and positioning control for an automobile (auto) top is particularly shown as applied to an auto top 1 which, when in raised forward position on the unitary auto body 2, overlies a seating space 3 which contains suitable seats 4 supported above a floor 5. The space 3 is defined between an intermediate cross-wall 6 and a front cross-wall 7 which extends upwardly from the floor 5 and provides a usual instrument-mounting panel at the upper portion thereof above a usual foot space. Side posts 9 extend upwardly from the body 2 adjacent the ends of the instrument panel and are connected and capped at their tops by a cross-member 10 to frame an opening at which a transparent windshield 11 is suitably mounted. The present body sides 12 are generally double-walled with opposed outer and inner wall portions connected at their tops by an edge 14 which generally defines the upper plane of the body. Forward portions of the body sides laterally bound the compartment space 3 and mount doors 15 in openings thereof depending from the upper lines of the body sides opposite the forward seat 4. Rearwardly of the compartment 3, the body sides are correspondingly stepped laterally outwardly, and the opposed inner side wall portions thereat are connected at their bottoms by a floor panel 16' defining the bottom of a luggage compartment 16.

A unitary closure assembly 17 is hinged to the body adjacent the cross-wall 6 for its normal disposal as a deck-lid for the body opening defined above the luggage compartment 16. As particularly shown, the closure assembly 17 comprises an inner (lower) frame member 18 comprising a plate which is suitably hinged to the auto body at its front end to allow its raising at the rear to best provide luggage-handling access to the compartment 16. At its outer side, the plate 18 hingedly carries a panel 19 comprising a lid for normally closing the outer side of a top-receiving deck-lid space 17' defined between the plate 18 and the lid 19 which is hinged to the plate 18 across the rear end thereof at which a suitable manually-releasable catch means is operative to secure the rear end of the deck-lid 17 in lowered closing relation to the compartment 16 beneath it. Preferably, and as shown, the plate 18 has depending side-edge stiffening flanges 18', while the lid 19 is wider than the plate 18 and fits the body opening defined above the compartment 16 and is provided with flanges 19' depending from its side edges for receiving the plate 18 between them.

A latch means is provided for releasably securing the top in raised position, and essentially comprises one or more latches 21 which are appropriately cooperative between the forward top end and the posts 9. As is particularly illustrated in FIGURES 13 and 14, an arm 22 extends forwardly and rigidly from the left end of a cross-flange 20 depending from the forward top end and through a complementary opening provided in the rear wall of the corresponding post 9 and swingably carries a catch-dog member 23 having its rear end portion laterally resting upon the top end of the lowered movable core 24' disposed in an upright solenoid 24" of an electro-magnet 24 mounted within the post, while its extremity is disposed opposite the forward side of the back wall of the post to then prevent a withdrawal of the member 23 through the post opening. The functioning of a latch 21 is essentially such that an energizing of the solenoid 24" of the electro-magnet 24 actuates the core 24' to lift the catch-dog 23 into alignment with the post opening to then permit a withdrawal of the arm 22 from said opening with the released top which is urged rearwardly from its limiting forward position by a suitable spring means for initiating a rearward top movement following a release of the top. To provide for an equalized retention of the top in its raised position, a latch assembly 21 may also, as indicated in FIGURE 26, be provided at the right-side post 9 for actuation in parallel with the left-side latch.

As is particularly brought out in FIGURES 1 and 4 and 5 and 12 and 13, the auto body structure provides a generally horizontal shelf member 25 which comprises a rearwardly-directed flat flange at the top of the intermediate crosswall 6 which is directed obliquely downwardly and forwardly from said shelf to a forwardly-directed bottom flange which in the present structure provides a rear support for the rear seat. The top panel 28 of the top 1 curves downwardly at its rear to a terminal forwardly-directed cross-flange 26 which connects depending sides 27 of the top panel and is arranged to be disposed and supportedly held opposite and along the rearward portion of the shelf 25 when the top is fully raised, and the flanges 20 and 26 and the sides 27 of the top 1 comprise integral stiffening parts of the present unitary and rigid top structure.

A spring means is provided for initiating a rearward movement of the top when the same is released at the latches 21, and in the present structure (FIGURE 4) comprises helical compression springs 29 having their forward ends fixed to and extending rearwardly from retaining spring-seat recesses provided within upstanding L-shaped studs 30 extending from the shelf 25 adjacent the body sides and having the rearward spring ends free and forcibly engageable with complementary spring seats provided by the bottoms of notches in the opposed rear cross-flange 26 of the top while the top is full raised, whereby the raised top is spring-biased for its slight rearward movement by the action of the springs 29 upon a release of the latches 21. Preferably, and as indicated in FIGURE 13, the upper wall of the spring-carrying recess of a stud 30 is tapered forwardly to wedgedly receive the corresponding portion of the flange 26 adjacent its spring seat recess as a positioning hold-down means for the rear of the raised top thereat.

An electro-magnetic latch 31 is provided for releasably securing the forward end of the lid 19 of the deck-lid assembly 17 to a forward upstanding cross-member 32 of the plate 18 of the assembly. As is particularly brought out in FIGURE 5, a latch 31 comprises a solenoid 33 mounted intermediately on the deck-lid 18 adjacent the cross-member 32 for magnetically controlling its movable core 34 which is arranged to function as a spring-loaded detent bolt and is normally projected forwardly from the solenoid 33 and freely through an opening in the cross-member 32 for the engagement of its beveled forward end in a transverse keeper opening 36 provided in an opposed and depending tongue or flange 37 provided at the forward edge of the lid 19 and arranged to function as a striker plate for the bolt 34 when the lid 19 is closed. For use in a manner to be hereinafter brought out, a switch assembly is mounted on the deck-lid plate 18 and provides a plurality of switches under the common control of a switch-actuating button 38 arranged for its operative engagement by the impact therewith of the rear end of the bolt 34 solely when an electro-magnetic withdrawal of the bolt is effected.

A suitable compression-spring means is operative in the closure space 17' between mutually opposed seats provided on the plate 18 and on the forward flange 37 of the lid 19 centrally of the latter for initiating an opening movement of the lid 19 with respect to the plate 18 when the lid is released. Also, it is to be specifically noted that the completion of the lid-closing movement against the combined resistance of the hereinafter-identified aforesaid spring means and of the spring-loaded beveled latch bolt 34 is not sufficient to engage the bolt with the switch button 38 to then change the setting of the switches controlled thereby.

Noting that the fully-lowered auto top 1 is adapted for its entirely concealed disposal within the space 17' of the deck-lid 17 in supported position therein, the present arrangement is essentially such that the lid 19 may be raised from its front end to permit the movement of the top to or from its mounted relation to the plate 18 while the plate is lowered (FIG. 1 and FIG. 2), or the closure unit may be swung upwardly from its rear to provide a particularly ready access to the luggage compartment 16 while the lid 19 is closed, either when the top 1 is fully raised (FIG. 1) or while the top is enclosed within the deck-lid 17 (FIG. 3), in an arrangement which provides for a relatively large and unencumbered luggage-receiving compartment 16 beneath the lowered deck-lid assembly. It is also to be noted that while the lid 19 has its forward flange latched to the forward flange member 32 of the plate 18 by means of the bolt 34, said secured flange is operative as a stop to prevent a lowering of the fully raised top or to prevent a movement of the enclosed top from within the closure unit.

The operations involved in the movement of the auto top 1 from and toward its limiting raised and lowered positions are arranged to be effected by suitable mechanisms operating in automatic sequence and by utilizing power derived from a usual vehicle-carried electric storage battery. Essentially, when the raised top 1 is to be lowered, the lid 19 is released at the latch 31 and is opened upwardly above the lowered plate 18, the forwardly positioned top 1 is released at the latches 21 and is moved rearwardly into fully supported position upon and above the plate 18, and the lid 19 is re-closed for its relatched retention by the latch 31 in a sequence of operations which is automatically carried out following the initiation thereof. Conversely, when the lowered top is to be raised, the lid panel 19 is released and swung open, the top is moved forwardly to its fully operative latched position over the compartment 3, and the lid panel 19 is then lowered to its retained latched position upon the deck-lid plate 18.

As particularly disclosed, a hydraulic means is provided for automactically raising and lowering the lid 19 with respect to the deck-lid plate 18 during movements of the top 1 between its limiting positions. Accordingly, a hydraulic cylinder 41 is fixedly mounted on the outer face of a side flange 18' of the plate 18 and has a piston rod 42 extending from it and so connected with the inner side of the corresponding side flange 19' of the panel 19 that the reciprocation of the piston rod 42 is operative to position the lid as required under control of a piston in the cylinder, the positioning of the piston being under control of a reversible pump 43 of a closed system in which the pump is connected to the different cylinder ends by flexible tubes (not shown). A reversible grounded electric motor 44 having power-connecting terminals 44–O and 44–C and mounted on and beneath the shelf 25 is directly connected to the pump 43 for operating the same, and is arranged for its automatic actuation to drive the pump for effecting an opening or closing of the lid panel 19 as required, whereby the motor 44 and pump 43 are arranged to cooperate as a lid-positioning means.

Understanding that the present lid-control connection for the cooperative cylinder 41 and pump 43 and motor 44 is necessitated by the fact that the closure unit 17 is mounted for its raising from the rear to provide access to the luggage-receiving compartment beneath it, it will now be noted that the plate 18 is directly attached to the cross-member 25 by a hinge 45 comprising rigid angle arms 46 connecting forward bottom points of the frame with hinge-pin trunnions 47 mounted on and beneath the cross-member 25 of the vehicle body. While such is not shown, it will be understood that a counter-balance means might be provided in cooperative association with the deck-lid unit 17 for its functioning to aid a compartment-opening lifting of the unit to provide access to the luggage compartment from the rear, and particularly while the unit contains the lowered top 1 as is illustrated in FIGURE 3. It is also to be noted that the rear end of the lid plate 19 is hingedly attached to a rear extension 18" of the plate 18 at a hinge pin 48 which provides a hinging axis extending parallel to the rear end of the top 1, and that a manually-releasable catch 49 having cooperative portions respectively provided on the plate extension 18" and a read body cross-member is normally operative to secure the rear end of the plate 18 to the body.

The present top 1 is provided with guiding and supporting connections between its rear end and laterally spaced parallel guideway tracks 50 having aligned forward and rear sections 51 and 52 respectively fixed on and beneath the body cross-shelf 25 and to and along the outer side of the deck-lid frame plate 18. In the present structure, the track portions 52 are fixedly mounted on the top of the inner plate 18 of the deck-lid for so functioning when the plate 18 is in its normal lowered position that the rear end of the top moving therealong is guided in a fixed fore-and-aft path between limiting forward raised (FIG. 1) and rear lowered (FIG. 2) positions in which it is respectively engaged by the guideway sections 51 and 52. For use in providing the present top-positioning control, the flange 26 across the rear end of the top 1 hingedly mounts mutually spaced like link members 53 (FIGS. 3 and 11 and 17 to 19) rockably depending from hinge pins 53' mounted on the flange and mutually aligned in a line parallel to the rear end of the top, with said links terminating at generally C-shaped portions 54 opening downwardly and arranged to selectively enclose the guide track portions 51 and 52 and mounting oppositely directed trunnion pins 55 arranged for their disposal in mutual alignment while engaged by the rear ends of flexible push-and-pull elements 56 which are longitudinally movable along the guide tracks 50.

As particularly shown in FIGURES 11 and 12 and 17 and 18, the guideway spaces within the rear and forward sections 52 and 51 of the track 50 are of like and uniform cross-section and those of the rearward section 52 are laterally defined between the plate 18 and an elongated plate 58 of uniform width which is fixed to the plate 18 by an outstanding side plate member 59, while mutually spaced coplanar flanges 61 and 62 of uniform width define the other sides of the guideway spaces and extend respectively from the plate 18 and the plate 58 to define between their opposed edges a uniform slot 63 which freely receives the trunnions 55 therethrough. The spaces of each forward track section 51 are laterally defined between a lower wall 64, an upper wall 58' effectively comprising an extension of the plate 58 and having its forward end portion fixed to and beneath the shelf 25, a connecting side wall 59' corresponding to the side member 59 of a track section 52, and slot-defining flanges corresponding to the flanges 61 and 62 of the track section 51 provided on the plate 18. Preferably, and as shown, the upper sides 58 and 58' of the track sections 52 and 51 extend laterally beyond the side walls of the tracks whereby the mutually inturned ends of the track-engaging part 54 of the connecting link arms 53 may engage beneath the extending edge portions of the parts 58 and 58' of the track portions 52 and 51 for preventing an outward disengaging movement of the rear top portion from the guideway tracks; the pins 55 could, as indicated, comprise the terminal chain connection of the link sides thereat, and may journal rollers between the connected link sides for spacing the links and engaging the bottom of the track to normally provide a rolling support for the rear end of the top thereat.

In the disclosed structure, the top-positioning elements 56 comprise chains which extend rearwardly from tubular guideway members 65 to terminal connections with the pins 55 provided by the portions 54 of the link arms 53. As shown, the guideway members 65 extend upwardly and rearwardly from beneath and behind the cross-wall 6 to points adjacent the forward ends of the forward track sections 51, and are arranged to prevent a buckling of the chains while the same are being used as pushing elements for disposing the top 1 in its limiting rearward mounted position upon the lid plate 18. Axially aligned sprocket gears 66 engage the chains 56 from beneath them at chain points adjacent the track sections 51, and are supported on the opposite ends of a shaft 67 of a grounded reversible electric motor 68 mounted on and beneath the shelf 25 and between the lines of the track sections and having power-connecting terminals 68-$b$ and 68-$f$.

The fore-and-aft movement provided for the present rigid top 1 between its limiting raised and lowered positions is preferably such as to maintain a constant angular relation of the top to the wheelbase of the carrying vehicle. Accordingly, struts 71 controlled by positioning links 72 are provided for so supporting the forward top portion as to maintain the angular relation of the top of the body, at least during fore-and-aft movements of the top by actuations of the chains 56. Essentially, the operative struts 71 are arranged to depend fixedly from the opposite side flanges 27 of the top 1 only while the top is disposed rearwardly of its limiting forward position, and are provided with rollers 73 at their lower ends for engaging the web portions of guide tracks 74 comprising upwardly opening channels retainably receiving the rollers between the channel webs and mutually inturned flanges 74' provided at the tops of the channel sides, with forward portions of said tracks provided at and along the top edges 14 of the body sides. In order that the struts 71 may depend from the top in their fixed angular relation thereto during a fore or aft shifting of the top, rearward portions of the guide tracks 74 are correspondingly curved downwardly from appropriately located slots in the body side edges 14 to extend as guards on and along the inner sides of the luggage compartment side walls in accordance with the downward curving of the rear parts of the guideway track portions 52 on the lid plate 18, and through the slots in the top body edges 14 so that the top 1 may maintain a fixed angular relation to the vehicle body as the top is lowered or raised with respect to said frame.

A power means is provided for disposing the struts 71 raised within the space of the top 1 solely while the top is held in its static forward position by the latches 21, as in FIGURES 1 and 14, and for lowering the struts into their fully operative position of FIGURES 1 and 13 at all times while the top is released. As particularly illustrated, the top-connected ends of the struts 71 are hingedly connected to brackets 75 which are fixed to and within the side flanges 27 of the top and swivel the forward ends of worm-screws 76 and 76' extending rearwardly therefrom along the flange for actuation by the shaft of a grounded reversible electric motor 77 having power-connection terminals 77-d and 77-u and mounted on a said flange. As shown, the worm-screw 76 comprises a coaxial extension of the motor shaft 77', and is connected by a suitable shaft-and-gear connection 77" to the other worm-screw 76' which is journalled in a swiveling bracket 75 and a bracket 75' at the opposite side of the top. The screws 76 and 76' intermediately and correspondingly mount traveling nut members 78 and 78' which are connected to correspondingly intermediate strut points by the like links 72, whereby mutually reversed actuations of the motor 77 may effect a raising and lowering of the struts with respect to the operative engagement of their rollers 73 with the tracks 74, the control of the reversible strut-positioning motor 77 being arranged to be automatically effected in synchronized relation to either the lowering or raising cycles of the top while the links 72 prevent a turning of the nuts.

By particular reference to the schematic showing of FIGURE 26, it will be noted that the arm-positioning traveling nut 78 carried by the worm-screw 76 is provided with an arm 79 extending radially and fixedly from the nut and arranged to control top-carried single-pole switches 80 and 81 in such a manner that the motor may be alternatively actuated in mutually reversed directions for moving the nuts 78 and 78' along the screws 76 and 76' to correspondingly effect a lowering or raising of the struts 71 while said switches function as limit switches to stop the motor with the nuts in limiting set positions when the struts are fully raised or fully lowered, it being noted that the nut members 78 are respectively disposed in forward and rearward positions on the worm-screws 76 when the control struts 71 are respectively lowered (FIG. 13) or raised (FIG. 14). By reference to the showing of FIGURE 26, the switch 80 is nearer to the motor 77 than is the switch 81 and comprises a swinging conductor arm 80' which is spring-loaded for its yieldingly urged engagement with a contact 80" while the conductor arm 81' of the switch 81 is spring-loaded for its yieldingly urged engagement with a contact 81". When the struts 71 are in their raised positions, the switch-controlling nut 78 is in a limiting rearward position in which the switch 80 is held open and the switch 81 is closed, and the conditions of the switches 80 and 81 are mutually reversed while the strut is fully lowered. Also, while the switch 81 is held open by the control nut, the arm 81' is engaged with the contact 82" of a switch 82 in the circuit of the latches 21.

The operations involved in moving the top 1 to and from its concealed position in the lid assembly 17 are under control of a two-way master-switch assembly 83 which may be conveniently mounted on the vehicle instrument panel for the optional setting of a conductor arm 84 thereof in different limiting positions to respectively close different circuits for effecting rearward or forward movements of the top. As indicated, the switch arm 84 is movable through an intermediate open-circuit position to alternatively engage contacts of single-pole switches 85 and 86 respectively comprising the conductor arm 84 and said contacts in circuits associated with movements of the top to and from its stored position in the deck-lid closure assembly 17. The present arm 84 is shown as interposed in a conductor wire 87 extending from one terminal of a storage battery 88 which could comprise the battery which supplies the needed electrical power to the usual electrically-operated devices of the auto and has its other terminal grounded to a metallic auto body frame or to a common ground for the system, said wire having a suitable fuse 89 interposed therein. The system controlled by the switch 83 is so related thereto that the setting of the switch arm 84 for a top-lowering or top-raising cycle of operations may be maintained after the operations have been completed.

The control switches 80 and 81 for the strut-positioning motor 77 are operative to close power circuits for the motor only while the top is secured in its forward position by the latches 21, and connections are provided for supplying the needed power through the master switch 83. Accordingly, and as particularly indicated in the diagram of FIGURE 26, like single-pole plug-type switches 91 and 92 and 93 have their plug contacts carried by and extending forwardly from the flange 20 of the top 1 for their simultaneous engagement in complementary contact sockets mounted on the body cross-member 10 connecting the tops of the posts 9, as is disclosed for the switch 91 in FIGURE 15. As shown, the plug contact of the switch 91 is connected with the common switch arm 81' of the switches 81 and 82, the plug contact of the switch 92 is connected with the fixed contact 80" of the switch 80 and the plug contact of the switch 93 is connected with the contact 82" of the switch 82. The sockets of the different said plug switches 91 and 92 and 93 are respectively connected to the fixed contact of the switch 85 and to the fixed contact of the switch 86 and to the grounded solenoids 24" of the latches 21.

The position of the top 1 also controls the condition of a switch 94 which is mounted entirely on the body member 10 above the windshield, said switch being closable in an appropriate control circuit for the top-moving motor 68 only when the top is spaced from the member 10. As particularly indicated in FIGURE 26, the switch 94 comprises a spring-loaded bridging conductor 94' which is arranged to connect switch contacts by the permitted action of its associated spring means. When the top is held fully raised, a forward end edge flange thereof engages a positioning stem 94" extending rearwardly from the switch element 94' to then displace the element for providing and maintaining an open-circuit condition at the switch 94, whereby a rearward displacement of the top by the action of the springs 29 is sufficient to permit a closing of the switch 94 by the spring means thereof. One contact of the switch 94 is connected to the body-carried wire 87 and its other contact is connected by a wire 95 to a switch in an activating circuit for the motor 68 whereby the closing of the switch 94 while a switch in the wire 95 is closed, may energize the motor 68 for effecting a rearward movement of the top following the release of the top by the energizing of the electro-magnetic latches 21.

It will now be noted that the activating of the catches 31 for withdrawing the bolts 34 to release the lid 19 for an opening of the top-receiving closure or deck-lid 17 is arranged to be effected through appropriate circuits which are energizable when manually closed at the different control switches 85 or 86 at the instrument panel. Thus, while the control switch 85 is closed, a branch 96 of a conductor 97 extending from this switch to the common terminal of the top-carried two-way switch 81—82 is closable at a single-pole switch 98 which is interposed in the branch and is closed only while the auto top is fully raised, said switch being shown as comprising a single contact plug mounted on the rear flange 26 of the top (FIG. 6) and engageable in a contact socket mounted on the body cross-member 25. Recalling that the catch 31 is mounted on the inner plate 18 of the deck-lid 17, said plate carries a switch assembly 100 including a switch 101 connecting the plug switch 98 and the grounded solenoid 33 of the latch 31.

When the control switch 86 is closed, the conductor connecting the switch 86 and the socket of the plug 92 is connected by a branch 99' of a conductor wire 99 to the solenoid 33 of the latch 31 by way of a switch 102 of the switch assembly 100 and to a switch 111 of a multi-switch assembly 110 which is controlled by actuations of the button 38 by the latch bolt 34. The switch assembly 110 provides switches 112 and 113 as well as the switch 111, and these three switches are arranged for simultaneous opening and closing under control of the bolt 34 and are so related to a common setting stem 114 controlled by the button 38 that successive inward displacements of the button by the electromagnetic withdrawal and release of the latch bolt 34 are arranged to simultaneously and respectively close and open the switches of the switch assembly 110, the switch 111 being open while the top is fully raised and the closure lid 19 is closed.

In general terms, and assuming that the top 1 is in its fully raised and latched position, a closing of the switch 85 results in a top-lowering cycle of operations in which the struts 71 are lowered from within the top by the action of the motor 77 while the lid 19 is released at the catch 31 for its limited upward swinging by the action of the motor-operated lid-positioning hydraulic pump 43 to open the deck-lid space 17' by the time the struts 71 have been fully lowered, whereupon the top is released at the catches 21 and is guidedly moved rearwardly by the energized motor 68 to a final stored position wholly within the opened deck-lid assembly 17 for a subsequent closing of the lid 19 to retainedly conceal the top within the cavity 17' of the closed deck-lid. When the lowered top is to be disposed in its raised position, a closing of the switch 86 results in a top-raising cycle which comprises, in order, the swinging of the lid 19 away from the member 18 for opening the deck-lid cavity 17', the guided forward movement of the top out of the cavity 17', the closing of the lid 19, and the folding of the struts 71 within the fully raised top.

The foregoing top-lowering and top-raising cycles, which are respectively initiatable by selectively closing the manual control switches 85 and 86, are arranged to be automatically carried through to their conclusions with a closed switch 85 or 86 remaining at the end of the completed cycle in the closed set condition which initiated that cycle. Also, it is to be noted that the present control system involves the provision in the circuits of the grounded two-way electric motors 44 and 68 and 77 of certain switches which are progressively and solely mechanically conditioned as required in the different cycles. Another advantageous feature of the present top-positioning system lies in the fact that either the top-lowering or top-raising cycle may be interrupted at any part thereof by opening both switches 85 and 86, with the interrupted cycle being resumable for its continuance by a re-setting of said switch to the position which initiated the cycle.

More specifically, the selective control of the lid-positioning motor 44 is arranged to be effected in part through solely mechanical settings of the switch assembly 100 mounted on the plate 18 and providing six switches including the switches 101 and 102 and a switch 103 which are all arranged to be open while the lid 19 is fully closed, and switches 104 and 105 and 106 which are arranged to be closed only while the lid 19 is more-or-less open. As is particularly indicated in FIGURES 6 and 7 and 26, the unitary switch assembly 100 is provided in, and is generally represented by, its housing mounted on the closure member 18 and having a two-part switch-control stem 107 extending outwardly from its housing for displacing engagement against spring resistance by the fully closed lid 19; as particularly shown, the stem 107 extends upwardly from the switch assembly and is displaceably engageable by a rearward projection 107' of the latch-mounting forward cross-member 32 of the lid when the lip is closed.

As illustrated, the switch control stem 107 is bipartite and extends rigidly from a bar member 108 which carries mutually insulated bridging contacts for connecting the poles of the switches 101 and 102 and 103 along one side thereof and bridging contacts for connecting the poles of the switches 104 and 105 and 106 along its other side, and said contact-carrying bar is spring-biased and has its stem appropriately guided to dispose the bar for a normal closing of the switches 101 and 102 and 103 by the action of a two-part compression spring 109 seated on the casing bottom and engaging the bar 108 whereby an opening of the lid is operative to effect the closing of the latter switches against the resistance of the spring 109 while opening the switches 104 and 105 and 106, and vice versa. In the present arrangement, the spring 109 is strong enough to alone initiate the previously described mechanical opening of the lid when the bolt 34 is inoperatively disposed by the action of the electro-magnet 33.

It will now be noted that an appropirate depression of the normally extended spring-loaded push button 38, which is under mechanical control of the bolt 34 and is held against rotation with respect to the switch assembly 110 providing it, is arranged to rotatively actuate the switch-setting stem 114 of the mechanism of the multi-switch assembly 110 which includes the switch 111. As shown in FIGURES 20 to 22 inclusive, the control button 38 is generally tubular, is closed at its outer end to provide for its displacing engagement by the bolt 34, has a radially off-set or belled-out portion of annular cross-section at its inner end, and is flattened at mutually opposite side parts forwardly of its inner portion whereby the outer button portion has a generally uniform oval exterior section outline therealong. As illustrated, the inner portion of the button 38 is guidedly engaged in the bore of a cylindrical collar 115 extending integrally and perpendicularly from about an interior opening provided in a flat plate 116 of the switch assembly, and the outer collar end is flanged inwardly to provide an opening for complementarily and slidably receiving the outer button portion for preventing a rotation of the button wtih respect to the collar while the shoulder connecting the inner and outer button portions provides a stop for limiting the extension of the button from the collar.

By particular reference to FIGURES 21 and 22 and 23 and 24, it will be noted that the actuating stem 114 for the multiple-switch assembly 110 has been formed of an initially flat strip of rigid material to provide a spirally formed intermediate portion 114' of uniform width and between outer and inner end portions 117 and 118 which are respectively engageable with the push button 38 and rotary mechanism of the switch assembly in such manners that successive inward displacements of the stem for an appropriate distance are arranged to alternately revolve the stem to open and close the switches of said switch assembly. As shown, the control button 38 has a plate member 119 non-rotatively fixed within and across its inner belled-out portion, and said member is provided with a diametric interior slot which constantly and slidably receives the intermediate portion 114′ of the stem 114 for a variable extension of the outer stem portion 117 within the space of the push button 38 as the latter is non-rotatively displaced inwardly against spring resistance and along the intermediate stem portion for rotating the stem.

As shown, the outer end portion 117 of the stem 114 is extendible through the slot of the plate 119 and has a more-or-less narrowed terminal part 117′ which is directed in perpendicular relation to the plane of the adjacent extension portion whereby said stem part is cooperative with the plate 119 in a manner to prevent an axial separation of the aligned button and stem after the installation of this assembly within the collar 115, while permitting a stem-rotating movement of the spiralled stem portion 114′ through the slot. As is brought out in FIGURES 22 to 25 inclusive, the portion 114′ of the switch-actuating stem 114 between its portions 117 and 118 is formed with a uniform spiral twist of 180°, whereby the end portions 117 and 118, except for the part 117′ of the portion 117, are mutually coplanar. The inner potrion 118 of the stem 114 comprises a generally T-shaped integral part terminating at a stem portion 118′ and having its head portion providing ears 118″ extending laterally beyond the portion 118′ which is shown as having the same width as the stem portion 114′. A helical spring 122 freely encircles the intermediate portion of the stem 114 in constantly compressed engagement between the plate 119 at the inner end of the actuating button 38 and the ears 118″ of the stem, whereby the stem is yieldingly spring-biased with respect to the plate 119 and the button 38.

It will now be noted that the body of the present multiple-switch unit 110 comprises a fixed and unitary assembly of three transversely aligned and unitarily connected body blocks 123 and 125 and 127 of uniform thickness and like peripheral outline having semi-cylindrical and rectangular parts respectively extending oppositely from and mutually coterminous at the diametric planes of their semi-cylindrical portions and mounting at one end the plate 116 carrying the button-guiding collar 115 and having the same outline as said blocks. The aforesaid block and plate elements clampedly engage shims between the successive elements which are held in transverse engagement in a suitable manner, as by clamp bolts 130 engaged transversely through the elements and shims at appropriate points, said blocks and shims being of electrically non-conductive material. As disclosed in FIGURES 20 and 21, the collar 115 is externally threaded, is engaged through an opening in the outstanding arm of an angle bracket 131 having its other arm suitably fixed to the deck-lid plate 18, and is secured in axially adjusted relation to the outstanding bracket arm by and between cooperative nuts 132 mounted on the collar 115, whereby the mounted switch assembly 110 is adjustable with respect to the actuating bolt 34 of the latch 31.

The body blocks 123 and 125 and 127 of the switches 111 and 112 and 113 are respectively provided with like coaxial and generally cylindrical cavities 124 which extend from the corresponding block end faces which are directed toward the plate 116 and contain similarly aligned and coaxially related switch block elements 133 and 135 and 137 which are arranged for their rotative adjustments together as a unit about the common axis of the semi-circular block parts by appropriate applications of the ears 118″ of the stem portion 118 against the element 133 adjacent the plate 116. The different rotary switch elements 133 and 135 and 137 carry like conductor elements 134 for providing connections between pairs of brushes 139 and 141 fixedly carried by the different body blocks 123 and 125 and 127 and respectively connected to wires in the circuits of the different switches 111 and 112 and 113. In the present assembly 110, the rotary switch elements 133 and 135 and 137 are of like peripheral outline and are provided with cavities 143 comprising cylindrical sockets coaxial with the axis of the stem 114 and extending into the blocks from the flat end faces of the elements which are directed toward the plate 116.

As shown, the socket 143 of the element 133 is arranged to normally receive the portion 118 of the actuating stem 114 for its free centered rotation therein and, accordingly, is provided with a smaller coaxial extension at its inner end in which the end portion 118′ of the stem is engageable as a constant centering means for the stem with reference to the larger bore portion which freely receives the stem ears 118″. The ears 118″ of the mounted stem 114 are normally spaced axially from a circular set of four like ratchet teeth 144 extending from the inner end portion of the cavity 143 about said cavity extension, and said teeth are engageable by the stem ears 118″ for effecting rotative adjustments of the block 133 each time the inward-disposed tooth-engaging stem is rotated in a particular direction to which it is restrained. The ratchet teeth 144 have corresponding faces 144′ thereof extending perpendicularly from a common plane at the base of the teeth and extend both radially and axially of the axis of rotation of the block 133, and said teeth have sloping faces 144″ correspondingly connecting the outer edge of each axial tooth face 144′ with the bottom of the next said tooth face, whereby the present tooth assembly is that of a flat ratchet gear.

By particular reference to FIGURES 23 and 24, it will be noted that the brushes 139 and 141 are of the return-bend leaf-spring type having contact arm portions 139′ and 141′ simultaneously cooperative, as hereinafter described, with portions of the conductor elements 134 carried by the rotary switch elements 133. The other arms 139″ and 141″ of the brushes 139 and 141 respectively are soldered or otherwise attached to the ends of switch lead wires which enter brush-receiving radial extensions of the cavities 124 through mutually parallel channels extending from the different planar block faces directed toward the plate 116 of the switch body assembly and extending perpendicularly from the flat side of the body assembly. The relation of the brushes 139 and 141 to each of the mounting body blocks 123 and 125 and 127 is such that the arms 139″ and 141″ of the brushes are secured in place in the extension portions of the block cavities 124 while the contact arm portions 139′ and 141′ of the brushes are constantly biased toward the peripheral edges of the rotary switch elements 133 and 135 and 137 in corresponding relations to a set of notches 145 provided in the edge of at least one of said elements.

Opposite its cavity 143, the rotary switch element 133 is provided with a stepped coaxial extension integral therewith and having an inner cylindrical portion extending centrally from a flat annular face thereof and providing a smaller terminal portion of square (uniform polygonal) cross-section, and said extension is engaged in a complementary socket of the adjacent block 135 receiving both of its parts, whereby the engaged latter block is turnably interlocked with the element 133 in fixed centered relation thereto. The intermediate rotary switch element 135 is provided with a stepped axial extension similar to that of the element 133 and having an outer portion 146 of polygonal cross-section, with said extension engaging a complementary axial socket provided in the element 137 for completing a rotatively interlocked connection of the switch block elements 133 and 135 and 137 for their rotation together. Opposite its turning socket, the rotary switch element 137 provides a coaxial and solely cylindrical extension which is freely rotatable in a complementary socket provided in the body block 127 to complete a multiple-switch assembly in which the aligned rotary elements 133 and 135 and 137 are mutually engaged for their coaxial rotative adjustment as a unit about their common axis when the control button 38 is actuated to rotate the stem 114 in the described manner.

As particularly shown, sets of four axial notches 145 are provided in the edges of all of the present rotary switch elements 133 and 135 and 137, are of like width peripherally of the elements, and are equally spaced about the elements. Each notch 145 of a said rotary switch element has a flat side 145′ extending radially of the common axis of rotation of the elements, while its other side 145″ is curved outwardly between the outer and inner ends of successive radial notch sides 145′. The contact arms 139′ and 141′ of the brushes 139 and 141 associated with each rotary switch member are arranged for their constant resilient engagement with the peripheries of the engaged members, and the inner free end of at least one said contact arm is engageable with a radial notch side 145′ for functioning as a stop to prevent a return rotation of the rotary switch block assembly and so insure the required solely one-way adjustments of the assembly in the direction indicated in FIGURE 24 when the stem 114 is operatively actuated by the button 38.

For electrically connecting the brushes 139 and 141 provided in each of the body blocks 123 and 125 and 127 of the multi-switch assembly 110 comprising the switch units 111 and 112 and 113, the like conductor members 134 comprise centrally apertured metallic plate elements fixed to and across each of the electrically non-conductive rotary switch elements 133 and 135 and 137 at the annular end faces thereof about their centering extensions portions. As shown, said conductor members 134 have flange portions 134′ extending similarly and transversely from them and countersunk in the curved sides 145″ of the notches 145 of the mounting element in solely one pair of opposite notches 145 of the element, whereby the outer faces of the flanges 134′ are flush with the notch sides 145″ to provide for a smooth engagement of the edges of the rotary elements with the brushes. To provide for the described mutual interlocking of the rotary members 123 and 125 and 127, the conductor members 134 are provided with central openings for the free projection of the axial member extensions therethrough.

While the present tri-switch assembly 110 is shown as arranged to simultaneously and alternatively provide either closed or opened conditions of its independently connectable different switches by reason of successive actuations of the stem 114 against the switch element 133, it will be understood that, by having the interlocking connections of the elements 133 and 135 and 137 alike, the present multi-switch assembly may be optionally arranged to simultaneously provide different combinations of switching conditions for the elements in their combination. On the other hand, it will be noted that the body block 125 of the switch 112 and its contained rotary switch element 135 might be omitted from the present switch assembly to provide solely a dual switch structure, or that more than one such switch unit 125—135 might be utilized between the switch assemblies 111 and 115 to provide various multi-switch combinations utilizing any useful number of switch assemblies 123—133 and 125—135 and 127—137 for alternate circuit-opening and circuit-closing re-settings by the actuator stem 114 for the present interlocked rotary switch elements.

The lid 19 also controls a multi-switch assembly 160 which is operative at the rearward lid end and provides a switch 161 which is arranged to be closed only while the lid is in its normal closed position or is opening, and switches 162 and 163 which are arranged to be automatically closed when the lid has been raised to its limit and are thereafter kept closed until the lid is fully reclosed.. As is indicated in FIGURES 19 and 26, the unitary switch assembly 160 is provided in a suitable casing fixedly mounted on the closure frame plate 18 at a rear point thereof and has an arm 164 of a controlling bell-crank lever extending upwardly from it and connected by a suitable actuating arm 165 with a rear point of the lid 19 for effecting a rocking of the lever between limiting positions imposed on it by the swinging of the lid between its limiting closed and opened positions following appropriate actions of the motor 44. The other lever arm engages an actuating stem 166 of a spring-biased bar member 167 which carries an insulated bridging contact for connecting the fixedly positioned poles of the switch 161 opposite one bar side, and also carries insulated bridging contacts for alternatively connecting the fixed poles of the switches 162 and 163 fixedly disposed opposite the other bar side. By particular reference to the switch 163, it will be noted that this switch is included in a branch of the conductor 87 which includes the switch 103 of the switch assembly 100.

As particularly indicated in FIGURE 26, the spring-biased contact-carrying bar 167 of the multi-switch assembly 160 is appropriately guided by the engagement of a transversely extending stem extension 168 thereof in the bore of a guide socket 169 to dispose the bar for a normal closing of the switch 161 by the action against the stem end of a compression spring 171 engaged between the socket bottom and the opposed outer stem end, whereby a full opening of the lid is operative to effect the opening of the switch 161 against the resistance of the spring 171 while closing the switches 162 and 163. An electro-magnetically controlled latch means is preferably provided for retaining the contact bar 167 in its displaced position during a closing movement of the lid, and the present said means comprises a latch bolt 172 normally extending through a side opening in the socket 169 in spring-biased holding engagement with a lateral dogging notch of the stem 168 when said notch is aligned with the appropriately-beveled bolt end. The present bolt 172 comprises the normally extended floating core of an electro-magnet solenoid 173 which is fixedly related to the socket 169, and the withdrawal of the bolt 172 against spring resistance is arranged to be effected when the grounded solenoid 173 of said electro-magnet is energized through connections including the closed switch 113.

Referring now to the circuit controlling the reversible top-positioning motor 68, it will be noted that a unitary switch assembly 180 disposed at the rear of the vehicle provides a switch 181 which is interposed in the wire 95 from the switch 94 to the motor terminal 68-b, and further provides an alternatively closable switch 182, it being noted that the switch 112 of the multiple-switch assembly 110 is also interposed in the conductor 95 between the switches 94 and 181. The multi-switch unit 180 is similar to that of the multi-switch 100 in that mutually insulated bridging contacts for the poles of the switches 181 and 182 are provided at opposite sides of a carrying bar 183 which is spring-biased for a closed condition of the switch 181, and is displaceable to open the switch 181 and close the switch 182 only when the top 1 is disposed in its limiting rearward position. It is to be noted that the conductor 87 from the battery 88 terminates at the switch 182 and includes the switch 113 of the switch unit 110. As indicated in FIGURE 19, the assembly 180 is mounted on the vehicle body at its rear and provides a push-button stem 184 arranged for its depression by its engagement by the trunnion 55 connecting the top to a top-closing chain 56 in a manner to then open, and hold open, the switch 181 and close the switch 182 when the top is fully lowered.

The control of the circuit for effecting a forward movement of the lowered top from its stored disposal within the closure 17 is also provided in part through the connections provided by a multi-switch assembly 190 having switches 191 and 192 in closed condition and in live circuits only while the switch 86 of the master-switch 83 is closed for a forward movement of the top and while the lid 19 of the closure 17 is fully closed, the switches 191 and 192 being spring-biased to an open condition. A switch 193 is also provided as part of the switch assembly 190, and is arranged to be closed while the switches 191 and 192 are open, and vice versa. The present switch unit 190 is also similar to that of the multi-switch unit 100 in that bridging contacts for the poles of the switches 191 and 192 and for the switch 193 are shown as provided at opposite sides of a bar 194 which is spring-biased for urging an open condition of the switches 191 and 192, and is displaceable to close the switches 191 and 192 and open the switch 193 while, and only while, the top 1 is in its fully raised and forward position.

As indicated in FIGURES 14 and 26, the switch assembly 190 is mounted on the cross-shelf 25 of the vehicle body, and the contact-carrying bar 194 is provided with a rearwardly-directed push-button 195 which is arranged for its forward displacement to close the switches 191 and 192 of the switch unit 190 upon its displacing engagement by the rear edge of the flange 26 of the raised top. As shown in the wiring diagram of FIGURE 26, one terminal of the switch 191 is connected to a branch 99" of the wire 99 while the other terminal of this switch is respectively connected to terminals of the switches 106 and 182 by branches 196' and 196" of a connecting wire 196, one terminal of the switch 192 is connected to the wire 87 and the other terminal of this switch is connected to a terminal of the switch 161 by a wire 197, and one terminal of the switch 193 is connected to the terminal 68-f of the motor 68 by a wire 198 while the other terminal of this switch is connected to a terminal of the switch 162 by a wire 199.

*Top-Lowering Cycle*

For descriptive convenience, the schematic wiring diagram of FIGURE 26 shows the control circuit conditions existing while the top 1 is secured in its raised position and the switch arm 84 of the two-way switch assembly 83 is in the open-switch position shown, or while the arm 84 closes the switch 86 as it was set for effecting the previous raising cycle for the top. When the secured top is to be lowered, the closing of the switch 85 provides a circuit through the closed plug switches 91 and 98 and the grounded solenoid of the electro-magnetic latch 31 for effecting the withdrawal of the latch bolt 34 to release the lid 19 and thereafter close the switch 111 of the switch assembly 110.

The lifting of the released lid 19 by the action of the spring 109 of the switch unit 100 reverses the initial switch settings of said switch unit 100 to thereby open the latch-releasing circuit at the switch 98 and close a circuit from the power wire 87 through the closed switches 113 and 182 and 103 of the switch assemblies 110 and 180 and 100 respectively to the terminal 44–O of the grounded motor 44 for actuating the latter for effecting a continued opening of the closure lid 19 toward its limit by the described hydraulic means including the pump 43. As the lid 19 reaches its limiting raised position (FIGURES 2 and 19) for fully opening the deck-lid space 17' to receive the top, it actuates the switch assembly 160 for opening the switch 161 in the motor circuit for its functioning as a limit switch with respect to the operation of the motor 44, and the lid is held in open position.

Simultaneously with the manual closing of the switch 85, a current flow is established through the plug switch 91 and the closed switch 81 and the terminal 77–D of the grounded top-carried motor 77, whereby to activate the motor 77 to shift the appropriate strut-positioning nut 78 for a closing of the switch 80 and a lowering of the struts which is automatically terminated when the moving switch-controlling nut opens the switch 81 as a limit switch to stop the motor action and thereafter close the switch 82 by the action of the stopping nut.

The closing of the switch 82 following the full lowering of the struts 71 energizes a circuit including the switch 82 through the plug switch 93 and the grounded solenoids of the electro-magnetic catches 21 to release said catches to free the front end of the top thereat, with the spring-operated top-releasing action taking place as or after the lid 19 has reached its limiting open position and with the springs 29 effecting a sufficient rearward movement of the released top to open the plug switches 91 and 92 and 93 and 98 and permit a closing of the switch 94 and reverse the connections at the switch assembly 180.

The closing of the switch 94 completes a closed circuit through the wire 95 and the switch 112 and the body-mounted switch 181 to the appropriate terminal 68–B of the grounded top-moving motor 68, whereby the activated motor is arranged to effect a rearward movement of the top into the opened space 17' of the closure 17. When the top reaches its limiting retracted position within the deck-lid, it actuates the switch assembly 180 to open the switch 181 as a limit switch to cut off the power to the motor while closing the switch 182.

The closing of the switch 182 by the limiting rearward disposal (FIGURE 19) of the top 1 completes a circuit from the wire 87 through the closed switches 113 and 103 and the terminal 44–C of the grounded motor 44 for activating the motor for closing the lid 19. As the lid is fully reclosed, it actuates the switch assembly 100 to open the switch 103 as comprising a limit switch with respect to the lid-lowering action of the motor 44, but without opening the switches of the assembly 110 as the latch bolt 34 engages the lid for its forcing back by the lid flange 37 to enter the keeper opening 36 therein.

*Top-Raising Cycle*

When it is desired to raise the lowered top 1 to its fully operative position, the switch 86 is manually closed, with the required simultaneous opening of the switch 85, whereby to energize a lid-raising circuit and effect the forward movement of the top to its limiting fully raised position.

Upon the closing of the switch 86, the release of the lid 19 is effected by energizing a circuit through the wire 99 and the closed switches 102 and 111 and to the grounded solenoid of the latch 31 to electro-magnetically withdraw the bolt 34 for releasing the lid for its initial raising by the action of the springs 104 of the switch assembly 100 and opening the switches of the assembly 110 by the switch-reversing projection of the withdrawn latch bolt 34 against the control button 38 of the latter switch.

The permitted raising of the released lid by the action of the springs 109 actuates the element 108 of the switch assembly 100 to close the switches 102 and 103 and 104 and so complete a circuit from the branch wire 99' through the closed switches 102 and 161 and 103 to the terminal 44–O of the grounded motor 44 to effect the raising of the lid until its opening limit is reached for effecting an actuation of the switch assembly 110 to open the switch 112 as a limit switch as the lid is fully opened.

When the switch 172 has closed, a circuit is closed through the wire 99 and the switch 172 and the switch 104 of the switch assembly 100 to the terminal 44–O of the motor 44 for actuating said motor to close the lid until the opening of the switch 104 as a limit switch for the motor is effected by the full closing of the lid.

The raising of the top to its limit also energizes a circuit through the plug switch 92 and the closed switch 80 and the terminal 77–U of the grounded strut-controlling motor 77 to actuate said motor to move the nut 78 for raising the struts to folded positions within the top while permitting a closing of the switch 81 and finally opening the switch 80 as a limit switch when the strut is fully raised, to thereby complete a top-raising cycle while mechanically conditioning the various switches for a subsequent provision of a top-lowering cycle solely by and upon a closing of the switch 85.

Controls in General

In view of the foregoing description of the present structural combination, and its operative cycles, it will be particularly noted that the present positioning controls for a rigid top for the body of an automobile of the convertible type desirable avoids the use of any electrically-actuated switches. Also, and except for the plug switch 98, the present switches are provided by a minimum number of groups of switches, and the switch 98 and all of said switch groups are mechanically controlled in accordance with difference relative positions of the top and the deck-lid and the vehicle body. It will also be noted that the present provision for the like conditioning of the switches 111 and 112 and 113 of the switch unit 110 functions in the circuits of the switches 112 and 113 to prevent mutually reverse power connections to the lid-controlling motor 44 and the top-positioning motor 68 while the motors are energized for functioning to provide require coordinated movements of the controlled elements.

From the foregoing description taken in connection with the accompanying drawings, the advantages of the present automobile top mounting will be readily understood by those skilled in the art to which the invention appertains. While I have shown and described a structure and operative arrangement which I now consider to comprise a preferred embodiment of my invention, I desire to have it understood that the showings are primarily illustrative, and that such changes and developments may be made, when desired, as fall within the scope of the following claims.

I claim:

1. In a convertible automobile, a body providing longitudinally aligned upwardly-opening forward passenger and rearward luggage compartments defined between the body sides and having a rigid top of fixed form retainedly and movably mounted on the body and arranged for optional disposal in limiting forward and reward positions above the respective compartments, a first reversible power means operative to move the top to and between said limiting positions on the body, a closure for said luggage compartment providing an interior cavity arranged to receive and fully enclose said top between lid and bottom members which are hingedly connected across the rear ends thereof for an opening of the closure cavity by a limited raising of the lid member above the compartment-closing bottom member to provide for a full reception or removal of the top with respect to the opened closure cavity, a spring latch means providing a spring-loaded bolt cooperative between the lid and bottom members of the closure to releasably effect and maintain a closed relation of the lid member to the bottom member while the top is disposed in either of said limiting positions, a spring means cooperative between the lid and bottom members of the closure biasing the lid for initiating its movement away from the bottom member when the latch bolt is withdrawn a second reversible power means automatically operative to move the lid member to its limiting open position with respect to the bottom member of the closure while the top is in one limiting position and to fully lower the lid member into latched position when the top has assumed its other limiting position, and means automatically operative while the lid is in open position to render the first power means operative to move the top to the other limiting position.

2. The combination of claim 1 in which the first power means comprises a reversibly operative electric motor having its energizing circuit providing limit switches which are arranged for automatic opening as the limiting positions of the top with respect to the body are reached, and the second power means comprises a reversibly operative electric motor having its energizing circuit providing limit switches which are arranged for automatic opening as the limiting open and shut positions of the closure lid are reached.

3. In a convertible automobile having a body providing longitudinally aligned upwardly-opening forward passenger and rearward luggage compartments and having a top of rigid structure retainedly and movably mounted on the body and extending forwardly from a body-engaging rear portion and arranged for optional disposal in limiting forward and rearward positions above the respective compartments, a first power means operative to move the top to and between said limiting positions, a normally closed top closure for said luggage compartment providing an interior cavity arranged to receive and fully enclose said top between a bottom member closing the luggage compartment and a lid hingedly connected to and above the bottom member and across the rear end thereof, a second power means operative to open said closure for a full reception or removal of the top with respect to the closure cavity solely while the top is disposed between said limiting positions, a catch means cooperative between said body an the forwardly-positioned top to releasably engage and hold the top in its said limiting forward position in supported relation to said body, a spring means cooperative between the body and the rear end of the forwardly-positioned top biasing the top for rearward movement with respect to the body, a strut member extendable form and beneath the top for cooperation with the body to maintain the top in fixed angular relation to the body during movements of the top along the body by the action of the first power means, a third power means operative to extend the strut member from the top; an electric power circuit operatively connected to said first and second and third power means for actuating the same, and control means in said circuit for causing said first and second and third power means to automatically operate in a predetermined order for effecting a movement of the top to and between said limiting positions.

4. The structure of claim 3 wherein the control circuit contains solely mechanically actuatable switches, the positions of the closure lid and of the strut member and of the top with reference to the automobile body are arranged to directly and cyclically condition said control switches of the circuit for the relative movements of the top and lid and strut elements in predetermined order, and said circuit includes a two-way master switch which is settable for initiating a top-moving cycle from either limiting top position to the other and is arranged to remain in its cycle-initiating setting at the conclusion of either cycle.

5. The combination of claim 3 wherein, starting with the top in its limiting raised forward position, the control circuit is automatically operative to sequentially effect the full lid-opening operation by the second power means, the full strut-extending operation by the third power means, the release of the catch means, the top-moving operation by the first power means to move the top to said limiting rearward position, and to finally effect a lid-closing operation of the second power means.

6. The combination of claim 3 wherein, starting with the top in its limiting lowered rearward position, the control circuit is automatically operative to sequentially effect the full lid-opening operation by the second power means, the top-moving operation by the first power means to move the top to its limiting raised forward and catch-engaged position, the lid-closing operation by the second power means following the removal of the top from within the closure, and the full withdrawal of the strut member by the third power means after the catch means has operatively engaged the top in its raised forward position.

7. In a convertible automobile having a body providing upwardly-opening passenger and luggage compartments aligned longitudinally of the body and a one-piece roofing top of rigid structure arranged for movement upon the body between a limiting fixed raised forward position in which said top is supported by the body at solely the forward and rear ends while its intermediate portion spacedly overlies the passenger compartment of the body and a limiting rearward position in which the top is disposed within the upper portion of the luggage compartment of the body, means constantly and rollingly supporting the rear end of said top from said body, and a normally withdrawn strut means carried by said top and projectible into supporting engagement with the body for supporting the forward portion of the top from the body while the top is disposed between said limiting positions with respect to the body.

8. The structure of claim 7 whereof the strut means comprises rigid arms of fixed effective length hinged to the top at forward points of opposite sides thereof and operatively engageable with and along opposite sides of the body at the passenger compartment while the top is disposed between said limiting positions with respect to the body.

9. The structure of claim 8 having means carried by the top operative to correspondingly project the strut arms while the top is disposed between said limiting positions and to retract said arms while the top is disposed in either of said limiting positions.

References Cited in the file of this patent

UNITED STATES PATENTS

| | | |
|---|---|---|
| 2,768,025 | Spear et al. | Oct. 23, 1956 |
| 2,770,489 | Garvey et al. | Nov. 13, 1956 |
| 2,782,070 | Chaban | Feb. 19, 1957 |
| 2,860,004 | Hollowell et al. | Nov. 11, 1958 |